United States Patent [19]

Volz

[11] Patent Number: 4,826,255
[45] Date of Patent: May 2, 1989

[54] ANTI-LOCK BRAKE SYSTEM WITH VARIABLE DELIVERY PUMP CONTROLLED IN RESPONSE TO DETECTED POSITION OF MASTER CYLINDER PISTON AND METHOD THEREFOR

[75] Inventor: Peter Volz, Darmstadt, Fed. Rep. of Germany

[73] Assignee: Alfred Teves GmbH, Frankfurt am Main, Fed. Rep. of Germany

[21] Appl. No.: 118,113

[22] Filed: Nov. 6, 1987

[30] Foreign Application Priority Data

Nov. 6, 1986 [DE] Fed. Rep. of Germany ....... 3637898
Aug. 7, 1987 [DE] Fed. Rep. of Germany ....... 3726304
Sep. 19, 1987 [DE] Fed. Rep. of Germany ....... 3731603

[51] Int. Cl.$^4$ .......................... B60T 8/32; B60T 8/44; B60T 13/12; B60G 17/08
[52] U.S. Cl. ........................................ 303/10; 60/545; 60/547.1; 60/582; 188/345; 188/358; 303/11; 303/92; 303/100; 303/114; 303/116; 303/117; 303/119
[58] Field of Search ....................... 303/92, 116, 10-12, 303/119, 117, 114, 113, DIG. 1-DIG. 4, 15, 100, 7-8; 188/355-360, 345, 181; 60/545, 547.1, 550, 551, 582, 552, 548, 555-559, 565

[56] References Cited

U.S. PATENT DOCUMENTS

| | | | |
|---|---|---|---|
| 3,671,082 | 6/1972 | Stevens | 303/117 |
| 3,765,172 | 10/1973 | Fineman | 60/545 |
| 3,877,226 | 4/1975 | Blum | 60/545 |
| 3,985,399 | 10/1976 | Mayer | 303/92 |
| 4,346,942 | 8/1982 | Leiber | 303/92 |
| 4,395,883 | 8/1983 | Melinat | 60/545 |
| 4,398,389 | 8/1983 | Horvath | 60/545 |
| 4,478,461 | 10/1984 | Leiber | 303/92 |
| 4,482,192 | 11/1984 | Leiber | 303/119 X |
| 4,489,555 | 12/1984 | Leiber | 60/551 X |
| 4,534,171 | 8/1985 | Leiber | 60/551 |
| 4,550,954 | 11/1985 | Leiber | 303/92 |
| 4,557,528 | 12/1985 | Leiber | 303/92 |
| 4,568,130 | 2/1986 | Leiber | 303/92 |
| 4,575,160 | 3/1986 | Leiber et al. | 303/114 X |
| 4,576,417 | 3/1986 | Dobner | 303/114 X |
| 4,580,847 | 4/1986 | Burgdorf | 303/114 X |
| 4,589,706 | 5/1986 | Leiber | 303/119 X |
| 4,603,918 | 8/1986 | Leiber et al. | 60/545 X |
| 4,621,565 | 11/1986 | Leigh-Monstevens | 60/545 X |
| 4,653,813 | 3/1987 | Burgdorf | 303/92 X |
| 4,729,611 | 3/1988 | Kircher et al. | 60/547.1 X |

FOREIGN PATENT DOCUMENTS

0034449 8/1981 European Pat. Off.

(List continued on next page.)

Primary Examiner—Douglas C. Butler
Attorney, Agent, or Firm—James B. Raden

[57] ABSTRACT

In a brake system for automotive vehicles comprising a master cylinder, wheel cylinders and a device for anti-lock control, the piston of the master cylinder is positioned in its nominal position by the variable volume of delivery of a pressure fluid source, in particular, a pump. The actual position of the piston is determined by a sensing device which is mounted on axially movable parts of the tandem master cylinder, booster, pedal assembly or other elements. The volume of delivery of the pump is adjusted so as to cause the piston of the master cylinder and, thus, the brake pedal to assume the desired position. For this purpose, the pump is connected with the pressure chamber of the master cylinder. Advantageously, it will be accomplished thereby that the brake pedal will not depress through its full travel when, during the control mode, more pressure fluid is removed from the hydraulic system, in particular from the pressure chamber of the master cylinder than the pressure fluid pump is able to deliver. Further, methods for monitoring the brake system with anti-lock control are provided wherein the sensing of the position, the direction of movement and/or the speed of the piston of the master cylinder are considered as an indicator for proper functioning of the anti-lock control device. This increases the safety of operation of the anti-lock device and its operating comfort.

10 Claims, 4 Drawing Sheets

FOREIGN PATENT DOCUMENTS

| | | |
|---|---|---|
| 0072745 | 2/1983 | European Pat. Off. . |
| 2237650 | 2/1973 | Fed. Rep. of Germany . |
| 2345860 | 3/1975 | Fed. Rep. of Germany . |
| 2605625 | 9/1976 | Fed. Rep. of Germany . |
| 2702819 | 7/1978 | Fed. Rep. of Germany . |
| 3020225 | 12/1980 | Fed. Rep. of Germany . |
| 3038947 | 4/1981 | Fed. Rep. of Germany . |
| 3044746 | 4/1982 | Fed. Rep. of Germany . |
| 3040561 | 5/1982 | Fed. Rep. of Germany . |
| 3040562 | 5/1982 | Fed. Rep. of Germany . |
| 3243019 | 5/1984 | Fed. Rep. of Germany . |
| 3345159 | 6/1985 | Fed. Rep. of Germany . |
| 3418043 | 11/1985 | Fed. Rep. of Germany . |
| 3442408 | 5/1986 | Fed. Rep. of Germany . |
| 3502451 | 7/1986 | Fed. Rep. of Germany . |
| 3505410 | 8/1986 | Fed. Rep. of Germany . |
| 3511535 | 10/1986 | Fed. Rep. of Germany . |
| 3526556 | 1/1987 | Fed. Rep. of Germany . |
| 3601914 | 7/1987 | Fed. Rep. of Germany . |
| 3607367 | 9/1987 | Fed. Rep. of Germany . |
| 1482877 | 8/1977 | United Kingdom . |
| 2109492 | 6/1983 | United Kingdom . |
| 2173270 | 1/1986 | United Kingdom . |
| 2170286 | 7/1986 | United Kingdom . |

ANTI-LOCK BRAKE SYSTEM WITH VARIABLE DELIVERY PUMP CONTROLLED IN RESPONSE TO DETECTED POSITION OF MASTER CYLINDER PISTON AND METHOD THEREFOR

BACKGROUND OF THE INVENTION

The present invention relates to a brake system, more particularly for automotive vehicles, comprising a master cylinder, wheel cylinders as well as a device for anti-lock control.

Brake systems have become known, see e.g. German printed and published patent application No. P 36 41 712.2, which are equipped with an anti-lock control system as well as with auxiliary pumps. These auxiliary pumps deliver pressure fluid into the working chambers of the master cylinder and into the wheel cylinders during the anti-lock control mode. According to a control algorithm, the wheel cylinder volumes are discharged into an unpressurized supply reservoir in the phase of pressure reduction. For the purpose of pressure modulation in the wheel cylinders, inlet and outlet valves are used which are allocated to the wheel cylinders. These inlet valves and outlet valves form the so-termed pressure modulator of the anti-lock control system. In the control mode, it is possible that so much pressure fluid will be discharged through the pressure modulator, (i.e., through the outlet valves for the pressure-modulated wheel cylinders) that the pressure fluid pump will not be able to compensate for this pressure fluid discharge by an increased volume of delivery.

In known systems; the pump, the pressure modulator and the pressure chamber of the master cylinder are hydraulically interconnected in such a manner that pressure fluid out of the pressure chamber of the master cylinder is allowed to discharge through the pressure modulator into the unpressurized supply chamber. If the delivery rate of the pump is not sufficient to compensate for the pressure fluid discharged, too much pressure fluid will be discharged from the pressure chamber of the master cylinder. Under the action of the brake pedal force or the force of the brake power booster, there will then occur undesirable movement of the piston of the master cylinder in the direction of the bottom of the master cylinder. In an extreme case, the piston will move into its most activated end position and, since the piston and the brake pedal are interconnected in terms of effect, the brake pedal may be depressed through its full travel. In such case, anti-lock control would be disconnected for safety reasons since an insufficient amount of volume is available for performing the anti-lock control function.

In the event of the brake pedal being shifted from the nominal position provided for the control mode, the actuation comfort will be diminished.

SUMMARY OF THE INVENTION

It is an object of the present invention to provide a system wherein, in the control mode, the brake pedal is maintained in a predetermined nominal position irrespective of the volume of pressure fluid discharging through the pressure modulator. It is a further object of this invention to position the piston of the master cylinder and, thus, the brake pedal in a desired position between the opposite end positions thereof.

Further, it is desired to have available a maximum reserve of pressure fluid in the pressure chamber of the master cylinder and in the adjacent parts of the hydraulic system upon failure of the pump.

Another object is to provide a control circuit which ensures that the pump delivers sufficient volume in order to position the piston of the master cylinder and, respectively, the brake pedal in its nominal position.

Yet another object resides in monitoring by simple, yet effective means, the proper functioning of the brake system and, in particular, the anti-lock control.

It is a further object of the instant invention to improve the pedal feel and to accomplish a reduction in structural efforts. Additionally, a high degree of fail-safe operation is desired to be attained.

These objects are achieved according to the instant invention by providing in the anti-lock control mode a pressure fluid source for positioning the piston of the master cylinder in a desired position. The pressure fluid source, preferably, is a pump, whose volume of delivery is variable. The pump communicates via a hydraulic line with the master cylinder and positions the piston by the volume of fluid delivered. Furthermore, a method for monitoring the brake system with anti-lock control is provided wherein, which during the anti-lock control mode, the position of at least one piston of the master cylinder is sensed and is used as evidence for the proper functioning of the brake system with anti-lock control.

Another monitoring method provided herein comprises sensing the direction of movement of at least one piston and using the sensed input as evidence for the proper functioning. It is likewise possible, during the anti-lock control mode, to sense the speed of the piston and to use this as evidence for the proper functioning of the brake system with anti-lock control.

Furthermore, a method is provided for monitoring a brake system with a master cylinder and wheel cylinders wherein during the anti-lock control mode the speed of at least one piston of the master cylinder is sensed and is used as evidence for the proper functioning of the brake system with anti-lock control.

A device for sensing the position and/or direction of movement and/or speed and/or acceleration, or deceleration, of at least one piston of the master cylinder can be utilized.

In the event that the brake system is furnished with a pneumatic brake power booster, the movable wall may represent a part of the sensing device. In a brake system with a hydraulic brake power booster, a movable part of this booster (more particularly the transmission piston/booster piston) may serve as a part of the sensing device. In an embodiment of this invention, a movable component part arranged in the area of the booster's control housing may represent a part of the sensing device. Moreover, a movable part arranged in the area of the pedal assembly can be a component of the sensing device. Likewise a movable component part placed at the tandem master cylinder can be utilized as a component for the sensing device. The movable component parts incorporated in the tandem master cylinder may also serve as parts of the sensing device. Thus, a component part arranged at the push rod may be a part of the sensing device at the same time. Said sensing device may comprise a magnetic coding which is attached to a movable component part, in particular to a piston. It is furthermore possible that the sensing device or a component part thereof may be designed as a stoplight switch or as a component part of the stoplight switch.

The positioning of at least one piston of the master cylinder may be effected by a control circuit with a circular action sequence, composed of a sensing device as a control measuring means for the actual position of the piston; a pressure fluid source, in particular a pump, with variable volume of delivery as a control member; and a control device which, in its capacity as an electronic control unit, is furnished with a reference input memory for the nominal position of the piston.

The device for the anti-lock control can be designed such that upon attainment of a specific residual volume of pressure fluid in the pressure chamber of the master cylinder and an ensuing specific shift of the piston from its nominal position, the anti-lock control will be disconnected by the sensing device.

In another embodiment of this invention, the device for the anti-lock control can be designed such that upon attainment of a predefined speed of reduction of the volume of pressure fluid in the pressure chamber of the master cylinder and a specific speed of the piston resulting therefrom, the anti-lock device will be disconnected by the sensing device.

It is proposed further that the control device processes the sensor signals of the sensing device which are supplied via a signal iine to the control device's input corresponding to the reference input and makes available at its output corrective signals for the pressure fluid source via a signal line. To this end, the reference input can be devised such that the piston's nominal position to be attained is intermediate end positions of the piston.

In a preferred embodiment, the electronic controller is equipped with a control algorithm, according to which the sensor signals supplied at the input of the electronic controller are processed to form corrective signals for the control of the volume of delivery of the pressure fluid source. These corrective signals are available at the output of the electronic controller. The control algorithm can be designed such that the controller recognizes the position, the direction of movement and/or the velocity of the piston which can be recognized by virtue of the sensor signals and processes this data for establishing the corrective signal.

Furthermore, it is proposed that the control algorithm is designed such that the controller determines the speed vector of the piston. This speed vector can be established by the sensor signals derived mathematically from the piston's radius vector computed against time, and is taken into consideration for establishing the corrective signals.

The control algorithm can be established in a manner such that the controller will determine the acceleration vector of the piston which can be recognized by virtue of the sensor signals which are mathematically derived from the piston's speed vector computed against time, and takes it into consideration for establishing the corrective signals.

In another embodiment of this invention, the control algorithm can be devised such that the controller ascertains the unevenly accelerated and unevenly decelerated movements of the piston which can be recognized by virtue of the sensor signals and takes them into consideration for establishing the corrective signals (variation of the acceleration/deceleration as a mathematical function of time).

If an electronic controller is used for anti-lock control, it can be adapted in an advantageous manner for the control circuit for positioning the piston.

In brake systems with an electronic controller, with a pressure modulator for the variation of the pressure in the wheel cylinders during the anti-lock control mode, with a master cylinder, a pressure fluid pump and lines connecting the pressure fluid pump with the pressure modulator and the master cylinder, it can be arranged that a control algorithm is installed in the electronic controller which compensates for movements of the master cylinder piston caused by discharge of pressure fluid occurring during the anti-lock control mode by issuing corrective signals to the pressure fluid source.

It can be provided in a corresponding manner that a control algorithm is installed in the electronic controller which compensates for movements of the master cylinder caused by a too great volume of delivery of the pump during the anti-lock control mode by issuing corrective signals to the pressure fluid source.

In a brake system with a pressure modulator composed of inlet valves and outlet valves for the modulation of the pressure in the wheel cylinders, it is suggested that the control algorithm installed in the electric controller compensates for pressure fluid discharges through one or more outlet valves into the supply reservoir of the brake system by issuing corrective signals to the pressure fluid source.

It can be arranged for in a particular embodiment of this invention that there is provision of a pump as a pressure fluid source whose volume of delivery is controlled by varying the rotational speed of the drive motor.

A prior anti-lock brake system is substantially composed of a pedal-actuated braking pressure generator having a brake power booster, a master cylinder, to which the wheel brakes are connected via main brake lines, of an auxiliary-pressure hydraulic pump, as well as of wheel sensors and electronic circuits for determining the wheel rotational behavior and for generating electric braking-pressure control signals which, for the purpose of slip control, serve to control electromagnetically actuatable pressure-fluid inlet valves and outlet valves inserted into the pressure-fluid lines, the brake lines being in communication via supply lines with the motively driven pump, whose suction port communicates via a suction line with the supply reservoir. In a known brake system of this type as disclosed in German published patent applications Nos. 30 40 561, 30 40 562, a master cylinder with a hydraulic brake power booster connected upstream thereof is used as a braking pressure generator. The auxiliary-pressure supply system comprises a hydraulic pump and a hydraulic accumulator, out of which auxiliary pressure proportional to pedal force is delivered on brake application with the aid of a control valve. On the one hand, this dynamic pressure is transmitted via the master cylinder into the static brake circuits connected to the master cylinder. On the other hand, the wheel brakes of one axle, prferably those of the rear axle, are in direct communication with the pressure chamber into which the pressure proportional to pedal force is introduced through the control valve. For the purpose of slip control, moreover, inlet valves are inserted both into the static circuits and into the dynamic circuit, which valves normally assume their open position and which, in the event of an imminent locked condition of a wheel, serve to shut off the pressure-fluid flow to the wheel brake concerned.

Besides, outlet valves are provided which allow pressure fluid to discharge from the wheel brake to the pressure-compensating reservoir in case of need. On commencement of slip control, the booster chamber in which the controlled pressure introduced out of the auxiliary-pressure supply system prevails is connected via a so-called main valve with the static brake circuit of the master cylinder in order to be able to replenish the quantity of pressure fluid removed through the outlet valves into the static circuit. In addition, for safety reasons, the piston (or pistons) in the (tandem) master cylinder will be reset or fixed by means of a positioning device. The structural efforts needed for generating, storing and controlling the hydraulic auxiliary pressure, for dynamic fluid delivery into the static circuits and for safeguarding the brake functions on failure of individual circuits are considerable.

In brake systems of this type, the control signals for the inlet valves and outlet valves are generated by means of electronic circuits, the inputs of which are connected with wheel sensors (e.g. inductive pickups for measuring data). The systems are thereby able to react on a change of the wheel rotational behavior indicative of an imminent locked condition by maintaining the pressure at the wheel concerned constant, by reducing it and by re-increasing it anew.

The present invention is concerned with the design of a brake system of the type described hereinabove such that the master cylinder pistons are reset in a controlled fashion on each slip control action, with a view to guaranteeing a maximum reserve for braking in the event of pump disturbance or pump failure. Finally, a particularly advantageous pedal feel is achieved for the driver of the vehicle.

This object is achieved according to the present invention in that the movable wall of the brake power booster cooperates with a travel-controlled electric switch which issues an electric signal determined by the position of the movable wall to the signal-processing circuit and, thereby, governs the number of revolutions of the pump's motor.

To this end, it may be provided further that the travel-responsive electric switch held at the booster housing comprises a travel sensor member, preferably with reed contacts, which abuts against the movable wall of the booster.

The motor of the pump can be designed as an electronically commutated direct-current motor and can be operated pulsewise by the signal-processing circuit.

The electric switch an be a capacitive, inductive, opto-electric or magnetic-field-sensitive travel indicator.

Furthermore, the electric switch can be arranged in a manner actuable by at least one axially slidable structural component of the booster or the pedal assembly.

The electric signal generated by the electric switch designed as a travel indicator can be read as a measure for the pedal speed by the signal-processing circuitry which latter, accordingly, determines the magnitude of current for operation of the pump motor.

The travel-responsive switch can be located in one of the pressure chambers of the brake power booster, with the travel sensor member being coupled with the movable wall or being designed as part of the movable wall.

In the presence of two brake-actuating circuits, each brake circuit can be equipped with a pump of its own. The pressure or supply lines are in direct communication with the pressure chambers of the master cylinder or with the main brake lines connected to the pressure chambers and with the motor driving the two pumps being switched on and off by the signal-processing unit.

The suction line of the pumps can be connected to the return line interconnecting the outlet valves and the supply reservoir.

According to another embodiment, the pistons of the master cylinder may comprise central control valves whose valve members, which are longitudinally slidable in a recess, each cooperate with an opening member, (e.g. a tappet) in such a manner that the tappet moves the valve member into its opened position when the piston is in the release position. The tappet is supported on a stationary pivot, cross member or bolt.

The valve member of the central control valve can be acted upon in the closing sense by a spring and can cooperate with a valve seat which is fixedly arranged on the piston of the master cylinder and adjacent to which is the longitudinal bore of the piston for the pressure fluid passage.

One prior anti-lock brake system is substantially composed of a master brake cylinder to which the wheel brakes are connected via pressure lines and inserted upstream of which is preferably a brake power booster, composed of a hydraulic pump, as well as of wheel sensors and electronic circuits for determining the wheel rotational behavior and for generating electric braking-pressure control signals which, for the purpose of slip control, serve to control electromagnetically actuatable pressure-fluid inlet valves and electromagnetically actuatable outlet valves inserted into the relief line, the master brake cylinder being in communication via supply lines with the motively driven pump, whose suction port is communicating via a suction line with the supply reservoir.

Such a brake system is disclosed for instance in published patent application No. P 36 019 14. Said brake system comprises a master brake cylinder with two working chambers which are connected to the wheel brakes, with the pistons that confine working chambers accommodating valves which establish a pressure fluid connection between the working chambers and the supply reservoir in the initial position of the pistons (brake release position). In the initial position of the pistons, the closure members of the valves are kept at a distance from the valve seat. When the brake is applied, first the valves will close so that pressure is permitted to develop in the working chambers. When it is detected by the slip control device during braking that any one of the wheels tends to lock, the pump drive will be switched on and the fluid delivery of the pump is directed to both the wheel brakes and the working chambers of the master brake cylinder. The operating pistons are shifted in the direction of their initial position. When the initial position is reached, the valves will open and, as a result, the pressure in the working chambers discharges to the supply reservoir. Yet, as the pistons continue to be loaded by pedal force, they will be displaced again such that the valves close. Eventually, a control action results this way which brings about that a pressure proportional to pedal force will prevail in the working chambers.

This prior brake system is characterized in that few valves are required to accomplish a hydraulic brake system which permits brake slip control in a satisfactory manner. However, a disadvantage of the prior system is that in the event of brake slip control the brake pedal is returned to its initial position together with an operating piston (i.e., the push rod piston). Since brake slip control becomes necessary only during very few braking operations, it is probable that at least some drivers will feel confused about the returning pedal. In any case, this action will be felt as unpleasant and disturbing.

Hence, a feature of the present system is to prevent by simple means the entire resetting of the pedal, while, simultaneously, the mode of function of the brake slip control system is maintained. This feature is achieved in that the pump can be switched on and off in dependence upon the position of the operating piston of the master brake cylinder.

The term 'switching on and off' is to be understood in a very general manner. A simple solution consists in switching the pump drive on and off, as it will be displayed hereinbelow in the description of the embodiment according to FIG. 3. However, there may likewise be provision of a bypass line from the pump outlet to the pump inlet. When this line is open, no more pressure can be built up at the pump outlet. The pump is not effective anymore.

Means for switching the pump can be made available in a variety of ways. For example, an electric switch can be provided which is actuated by the push rod piston of the master brake cylinder or by a component part which is coupled to the push rod piston in a defined manner, for instance the pedal assembly.

In case there is provision of a hydraulic or a pneumatic booster, the switch can also be actuated by the booster piston, that means the wall of the booster which is moved by the pressure fluid.

Further, it can be arranged for the switch condition of the switch to be recorded by the electronic circuits for generating the brake slip control signals.

The switch itself can be produced in various ways. For example, the switch actuation can be performed by a ramp at the operating piston of the master cylinder.

It can be provided that the switch operates inductively, capacitively, opto-electronically or magnetic-field-sensitively.

In another embodiment, the switch can be actuated by using a reed contact, the said reed contact being activated by a punctiformly magnetized spot on the piston.

In order to prevent too frequent switching on and off of the pump in control action, it may be expedient to provide for means which produce a hysteresis in the switch-on and switch-off phases. This can be realized either by two switches which are actuated in different positions of the push rod piston or by a time-delay circuit.

Another embodiment of the invention can provide for the master brake cylinder to be formed by a tandem master cylinder whose working chambers are each allocated to a pump. These pumps can be driven by one joint electric motor. Each piston of the tandem master cylinder can be furnished with one switch. The pump's drive can be adapted to be switched on and off.

A further feature of the present invention resides in attaining a variation of the volume of delivery of the brake system's pressure fluid source by simple means. This feature is achieved by providing a pump as a pressure fluid source, the pump comprising stroke elements, preferably pistons moved by an eccentric, with the strokes of the stroke elements being variable for the purpose of variation of the volume of delivery. Thus, it may be arranged for the shaft of the pump to be located axially slidably and the shaft to be an eccentric which moves radially of the pump pistons when the shaft is axially shifted.

Herein, the shaft can be designed to be axially displaceable by a pull magnet which can be activated by the output signal of the electronic controller.

A cost-efficient design can be accomplished by providing the electric drive motor for the pump and the rotor of the pump with a joint shaft. In this arrangement, the shaft may comprise a multiple eccentric.

In another embodiment, an axially slidable cam member can be arranged on the shaft. Further, there may be provision of a shift magnet which, via a thrust bearing, can move the rotor and/or the shaft of the pump in an axial direction.

The instant invention can also be embodied by there being provision of one or more couplings which, depending on the requirement for fluid delivery volume, in response to the corrective signal of the electronic controller, will connect one or more pumps, pump stages, pump pistons with the drive motor in terms of effect.

This invention enables achievement of the following advantages:

The shortcomings of the prior art depicted hereinabove will be avoided. During the control mode, the piston of the master cylinder is definedly seated in a desired position.

There is accomplished a method for monitoring the proper functioning of the brake system and of the anti-lock system which increases the operational reliability of the entire system.

The pedal feel is improved. The structural effort is reduced. There is no need for additional brake lines or valves for fulfilling the objects to be achieved. The electric motor runs during the entire anti-lock control and this increases safety. It is not necessary to speed up the motor several times, which avoids peaks of current. The structural effort is minimal. A high degree of failsafe operation is achieved. In tandem master cylinders, the floating piston is reset until the central valve's control position, since the floating piston is not sensed. Only the push rod piston is sensed. The displacement of the shaft with eccentric or cams can be effected by the electric connection of the electric motor. This obviates the need for additional cables and plugs. When using eccentrics, it is possible to vary the rate of delivery several times by switch over. The travel indicator described in the embodiments can be used for the purpose of sensing in the anti-lock control mode in such a manner that, advantageously, additional pressure switches become superfluous.

BRIEF DESCRIPTION OF THE DRAWING

The invention will be better understood from the following Detailed Description of several embodiments of this invention taken in conjunction with the drawings in which.

DETAILED DESCRIPTION OF A PREFERRED EMBODIMENT

Figure 1:
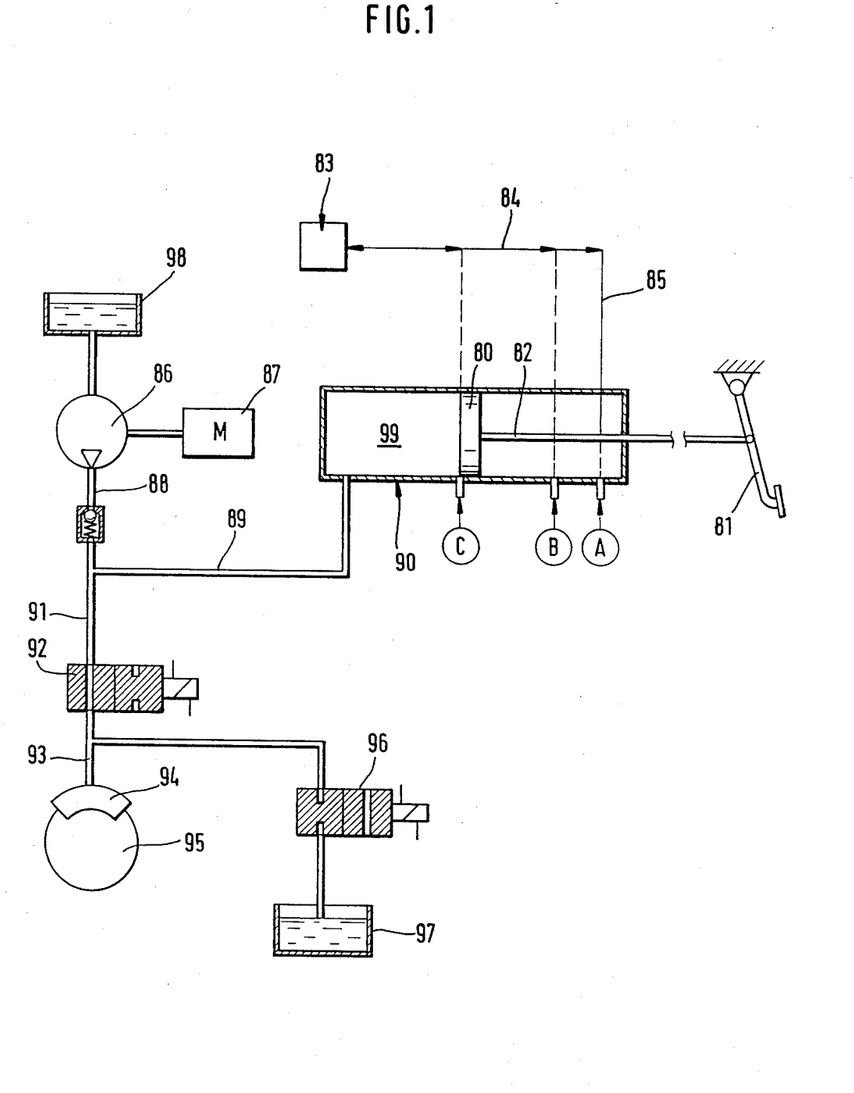
FIG. 1 is a simplified schematic view of the essential components of the present invention.

FIG. 1 displays schematically a master cylinder with a piston. A mono-type master cylinder is shown. In a tandem-type master cylinder, the states of affairs stated hereinbelow apply in a corresponding manner for the push rod piston.

Figure 2:
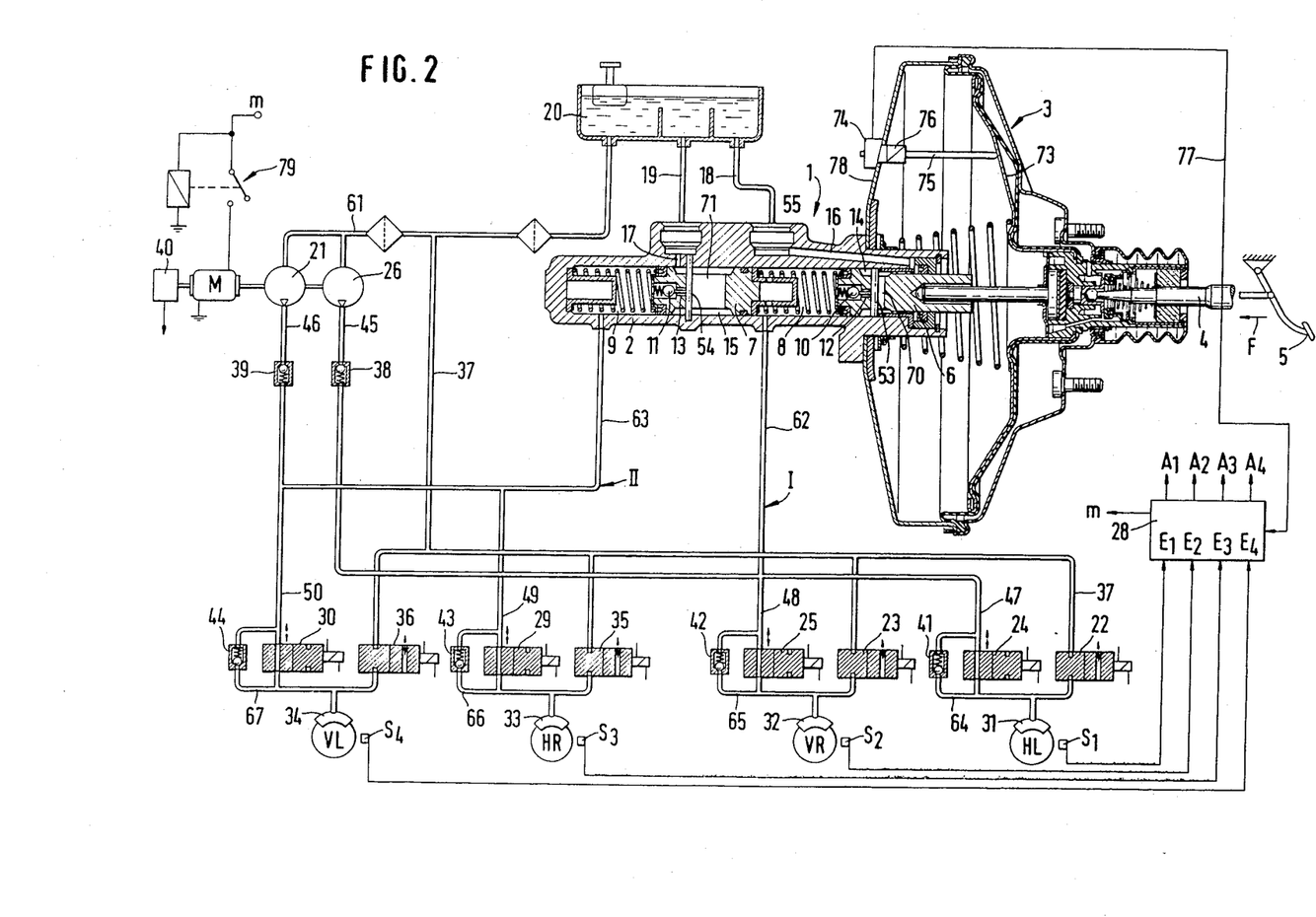
FIG. 2 is a sectional and partial view, on an enlarged scale, of an embodiment of the brake system of the present invention.

In the normal braking mode, the piston 80 is moved from the inactive position A to the left by the brake pedal 81 and the piston rod 82. Reference numerals 83, 84, 85 designate in FIG. 1 component parts of a sensing device which determines the positions, the direction of movement and the velocity of the piston 82 and issues this data as electric sensor signals to an electric controller which is assigned reference numeral 28 in FIG. 2. Further details of the sensing device are shown in FIG. 2.

In FIG. 1, three positions A, B, C of the piston are shown which are sensed by the sensing device as belonging to the above-described purpose of the sensing device.

The position A is the right end position of the piston. The position B is the nominal position of the piston during the anti-lock control mode which is desired from the prospective of control technology. Position C is the left end position of the piston.

Reference numeral 86 designates a hydraulic pump which is driven by an electric motor 87. Said pump has a variable volume of delivery. The variation of the volume of delivery can be effected by electrical means, as is shown for instance in the description of the embodiment according to FIG. 2. However, there may also take place a control of the volume of delivery by mechanical means, as is discussed in view of the embodiments of this invention depicted in FIGS. 3 to 7. Finally, control of the volume of delivery of the pump can be performed by actuating one or more couplings which are placed intermediate the drive motor and the pump or inside the pump and which are driven by the output signals of the electronic controller.

The pump 86 communicates via the lines 88. 89 with the master cylinder 90 and via the lines 88, 91 with the inlet valve 92 and via the line 93 with the wheel cylinder 94 of the wheel brake 95.

During the anti-lock control mode, the wheel cylinder 94 is connectible via an outlet valve 96 with an unpressurized supply reservoir 97 temporarily, namely as dictated by a control algorithm from an electronic controller such as controller 28 in FIG. 2. The supply reservoir 97 and the supply reservoir 98 on the pump suction side can form an integral unit.

The inlet valve 92 and the outlet valve 96 are electromagnetically actuatable valves. The inlet valve is open when the actuating magnet is de-energized. Therefore, it is referred to as 'valve open when de-energized' or 'SO-valve'. The outlet valve is closed when the actuating magnet is de-energized. Therefore, it is referred to as 'valve closed when de-energized' or 'SG-valve'. Actuation of these valves is effected by output signals of the electronic controller 28 of FIG. 2.

Stored in the electronic controller 28 is the control algorithm which, as will be described in greater detail hereinbelow, determines switching of the SO-valves and SG-valves. By switching the SO-valves and SG-valves, the phases important for the anti-lock control mode (i.e. pressure reduction, pressure maintaining and re-increase of the pressure in the wheel cylinder) will be carried out.

Pressure reduction is achieved by closing of the inlet valve and opening of the outlet valve. Maintaining the pressure constant is achieved by closing the inlet valve and keeping the outlet valve closed. Pressure increase is achieved by an open inlet valve and a closed outlet valve.

During the phase of pressure reduction, the control mode dictates that fluid volume is taken from the line system and from the master cylinder connected to the line system, said volume flowing off through the open SG-valve. The discharging volume can be of so large an amount that the rate of delivery of the pump does not suffice in order to compensate for the discharging volume. The piston and the brake pedal coupled to the piston are moved to the left under the action of the pedal force which is not desirable. In an extreme case, the brake pedal will depress through its full travel. The piston will then have adopted the left end position C illustrated in FIG. 1.

The sensing device senses the actual position of the piston and, as has been previously mentioned, its direction of movement and its speed. Via a signal line (see FIG. 2), this information is supplied as input signals to the electronic controller 28. After having processed these input signals, the electronic controller makes available output signals for the control of the volume of delivery of pump 86. As mentioned, the control of the volume of delivery can be performed electrically via the electric drive or by virtue of mechanical means.

The thus adjusted increased volume of delivery propagates during the control mode at least partially through the line 89 into the pressure chamber 99 of the master cylinder. As a result, the piston is shifted from its initial position (e.g. the undesirable end position C) to the desired nominal position B.

If desired, the operating piston can be moved from the extreme right position (position A) into the desired intermediate position (position B) in a corresponding manner. Therefore, the volume of delivery is to be reduced accordingly. In this arrangement, too, the sensing device supplies corresponding electric signals to the electronic controller. The latter processes the signals on the basis of a control algorithm conformed to customer's requirements to form corrective signals for the delivery rate of the pump.

As can be gathered from the preceding description, a circular action sequence in the sense of a control circuit is at issue. The sensing device is the measuring means of the control circuit which is arranged at the end of the control distance of pump - master cylinder piston. From the point of view of control technology, the sensor signals of the sensing device are input signals of a control device which is designed as an electronic controller in the present case. In this control device, a controlling reference input in the form of a control algorithm is installed for obtaining a nominal position of the piston. Processing the input signals according to the algorithms leads to manipulated variables at the output of the control device. These manipulated variables or output signals, respectively, adjust the volume of delivery which is necessary to position the piston in the nominal position. From the point of view of control technology, the pump with its variable volume of delivery is to be regarded as a control member. That is to say, the described control circuit provides for a balance between the fluid volume discharging from the pressure chamber of the master cylinder and the rate of delivery of the pump.

It can be noted from the foregoing that the position of the operating piston in the master cylinder can be utilized as evidence for the proper or faulty operation of the entire anti-lock control system.

In addition to the actual position determined by the sensing device, the tendencies of movement of the piston to the left or to the right which are sensed by the sensing device and the velocities of the piston detected by the sensing device are an indication of the proper or faulty operation of the anti-lock system. Movement of the piston to the left implies, for instance, the possible existence of a defect. Rapid movement to the left may imply that there is a major defect, for example pipe burst or undesired throttling of the fluid flow on the pump suction side.

The previously described methods for monitoring the brake system with anti-lock control by sensing the position, the direction of movement and/or the speed of the piston are the solution of an important object of this invention, that is to say, to increase the inspection and the safety of the brake system and anti-lock system.

In the embodiment of this invention illustrated in FIG. 2, the inventive brake system includes a braking pressure generator 1 having a hydraulic unit which is substantially composed of a tandem master cylinder 2 and a vacuum booster 3 connected upstream thereof. Via a push rod 4, the pedal force F applied on a brake pedal 5 is transmitted in a known fashion to the vacuum booster 3 and boosted by auxiliary force, the force is further transmitted to the working pistons 6 and 7 of the tandem master cylinder 2.

In the illustrated release position of the brake, the pressure chambers 8, 9 of the master cylinder 2 are in communication with a pressure-compensating and pressure-fluid supply reservoir 20 via open central control valves 10, 11, via connecting channels 12, 13 in the interior of the pistons 6, 7 as well as via annular chambers 14, 15, via connecting bores 16, 17 and via hydraulic lines 18, 19.

The two brake circuits I, II of the master cylinder 2 communicate with the wheel brakes 31, 32, 33, 34 via electromagnetically actuatable valves which are open in their initial position, that is to say so-termed SO-valves (SO—opened in their de-energized state) or inlet valves 24, 25 and 29, 30, respectively. The parallel connected wheel brakes 31, 32, and 33, 34, respectively, are allocated to the diagonals.

The wheel brakes 31, 32, 33, 34 are connected further to electromagnetically actuable outlet valves 22, 23 and 35, 36, respectively, so-termed SG-valves (SG—closed in their de-energized state) which are closed in their inactive position and which, via a hydraulic return line 37, are in communication with the pressure-compensating reservoir 20, on the one hand, and, via the suction line 61, communicate with the suction sides of the pumps 21, 26, on the other hand. Said pumps are hydraulic pumps driven electromotively (motor M). The electrical connections 'm' and ground are likewise illustrated symbolically. Besides, there is provision of an electrically operating function-monitoring device (i.e., monitoring circuit 40) which enables the mode of operation of the motor M to be checked.

The vehicle wheels are equipped with inductive sensors $S_1$ to $S_4$ which cooperate with a toothed disc corotating synchronously to the wheel rotation and which generate electric signals indicative of the wheel rotational behavior (i.e., the wheel speed and variations thereof). These signals are fed via the inputs $S_1$ to $S_4$ to electronic signal-processing and combining circuitry 28 which generates braking-pressure control signals serving to temporarily switch over the inlet and outlet valves 22, 23, 24, 25, 29, 30, 35, 36 on detection of an imminent locked condition and to, thereby, keep the braking pressure constant, to decrease it and to re-increase it at the appropriate time. To this end, the actuating magnets of the inlet and outlet valves are driven via the outputs $A_1$ to $A_4$. The electric connecting lines between the ports $A_1$ to $A_4$ and the coils of the valves 22, 23, 24, 25, 29, 30, 35, 36 are not illustrated for the sake of simplicity.

The circuitry or electronic controller 28 can be realized in a known fashion by hard-wired circuits or by programmed electronic units, such as microcomputers or microcontrollers.

Connected with the circuitry or electronic controller 28, via a signal line 77, is a travel-responsive switch 74 (e.g., a potentiometer) which is secured to the housing shell 78 of the vacuum booster 3 and whose travel sensor member 75 abuts on the diaphragm plate 73. Motor M of the two pumps 21, 26 can be switched on and off by means of a relay 79 which, in turn, is connected to circuitry 28 via a non-illustrated cable.

The brake system according to FIG. 2 operates as follows:

On brake application, the pedal force F boosted by the vacuum in the booster 3 is transmitted to the master cylinder pistons 6, 7. The central control valves 10, 11 close, allowing braking pressure to develop in the pressure chambers 8, 9 and hence in the brake circuits I, II which propagates via the valves 24, 25 and 29, 30, respectively, to the wheel brakes 31, 32 and 33, 34, respectively.

On detection of an imminent locked condition at one or more of the wheels by means of the sensors $S_1$ to $S_4$ and the circuitry 28, slip control will commence. The drive motor M of the pumps 21, 26 will be switched on in consideration of the signal generated by the travel-responsive switch while pressure develops in the two supply lines 45, 46. This pressure is applied to the wheel cylinders of the wheel brakes 31 to 34 via the non-return valves 38, 39 and the branch lines 47, 48 and 49, 50, respectively, and via the inlet valves 25, 26 and 29, 30, respectively, on the one hand. The developed pressure also acts upon the pressure chambers 8, 9 of the master cylinder 2, on the other hand.

A signal of the circuitry or electronic controller 28 results in change-over of the electromagnetically actuatable inlet valves 24, 25 and 29, 30, respectively, and thus causes closure of the brake circuits I, II and the branch lines 47 to 50, respectively. Further displacement of the master cylinder pistons 6, 7 in the direction of the pedal force F as well as emptying of the pressure chambers 8, 9 is precluded, since the pressure fluid of the pumps 21, 26 flows via the feed lines 45, 46, the opened non-return valves 38, 39 and the main brake lines 62, 63 into the pressure chambers 8, 9 and urges the pistons 6, 7 back to their initial positions. The actual braking pressure variation in the wheel brakes 31 to 34 is determined by the inlet and outlet valves 29, 30, 35, 36, which are furnished with further slip-controlling braking-pressure control signals via the lines $A_1$ to $A_4$.

As can be seen from FIG. 2, the inlet valves 24, 25 and 29, 30, respectively, are protected by parallel connected non-return valves 41, 42 and 43, 44, respectively. In special cases, these non-return valves 41, 42 permit termination of the braking pressure control and release of the wheel brakes, respectively, since a small quantity of pressure fluid can flow back from the wheel brakes 31 to 34 into the pressure chambers 8, 9, with the inlet valves 24, 25 and/or 29, 30 and the outlet valves 22, 23 and/or 35, 36 still closed, provided that the pistons 6, 7 of the master cylinder 2 have been returned to their initial position and the central control valves 10, 11 are in their opened condition.

Each central control valve 10, 11 includes of a tappet which is slidably accommodated in a longitudinal bore of the piston 6 and 7, respectively and whose pedal-side end abuts on a stationary bolt 53 and 54, respectively, which extends transversely through the piston bore 55 of the master cylinder 2 and which lifts the valve ball from its valve seat in the release position. To this end, each valve ball is held in a cage and is displaceable in opposition to the force of a closure spring. In the valve's position illustrated in FIG. 2, the pressure fluid can flow out of the pressure chamber 8 through the annular gap between valve ball and valve seat, through the longitudinal bore and the transverse groove into the annular chamber 14 and through the channel 16 back into the pressure-fluid supply reservoir 20. As soon as the pistons 6, 7 are displaced by the pedal force F from their illustrated position in the direction of the arrow, the valve balls will seat on the valve seats and thereby close the respective longitudinal bore. Depending on the magnitude of the pedal force F, the central control valves 10, 11 may adopt a breathing position, with the pistons 6, 7 lifted at least partially from the cross members or bolts 53, 54.

In order to prevent the pistons 6, 7 from being reset too rapidly when the pumps 21, 26 start to operate, the starting current or the frequency of the motor M is determined by the respective position of the travel sensor member 75 of the travel responsive switch 74. If the diaphragm plate 73 at this stage has moved relatively far in the direction of the arrow F, (i.e., if the two pistons 6, 7 have been displaced in the actuating direction by the major amount of their entire stroke), then the motor will start to run with a comparatively high number of revolutions. If, however, the diaphragm plate 73 is almost in its inactive position (i.e. initial position), then the motor M will be actuated so that it runs with a comparatively small number of revolutions.

Instead of using an electric motor M actuated by virtue of a relay 79 without the possibility of speed control (e.g., a synchronous motor), it is also possible to use a motor with several speed stages or a motor with invariable speed control (e.g., a series-wound motor) whose rotational speed can be varied by field weakening. An electronically commutated direct-current motor which is operated pulsewise has provided to be particularly preferred.

It is also clear that the consumption caused by control (the pressure fluid consumed in the event of wheel slip control) has a direct influence on the start up of the pump motor M. A sudden (i.e., abrupt) resetting of the brake pedal 5 is avoided when the rotational speed of the pump is conformed to the respective consumption for control. Furthermore, the motor M may likewise be chosen to be such as to dispose of a phase actuation or frequency actuation, with corresponding pulses and/or control currents being generated by means of the circuitry 28.

Figure 3:
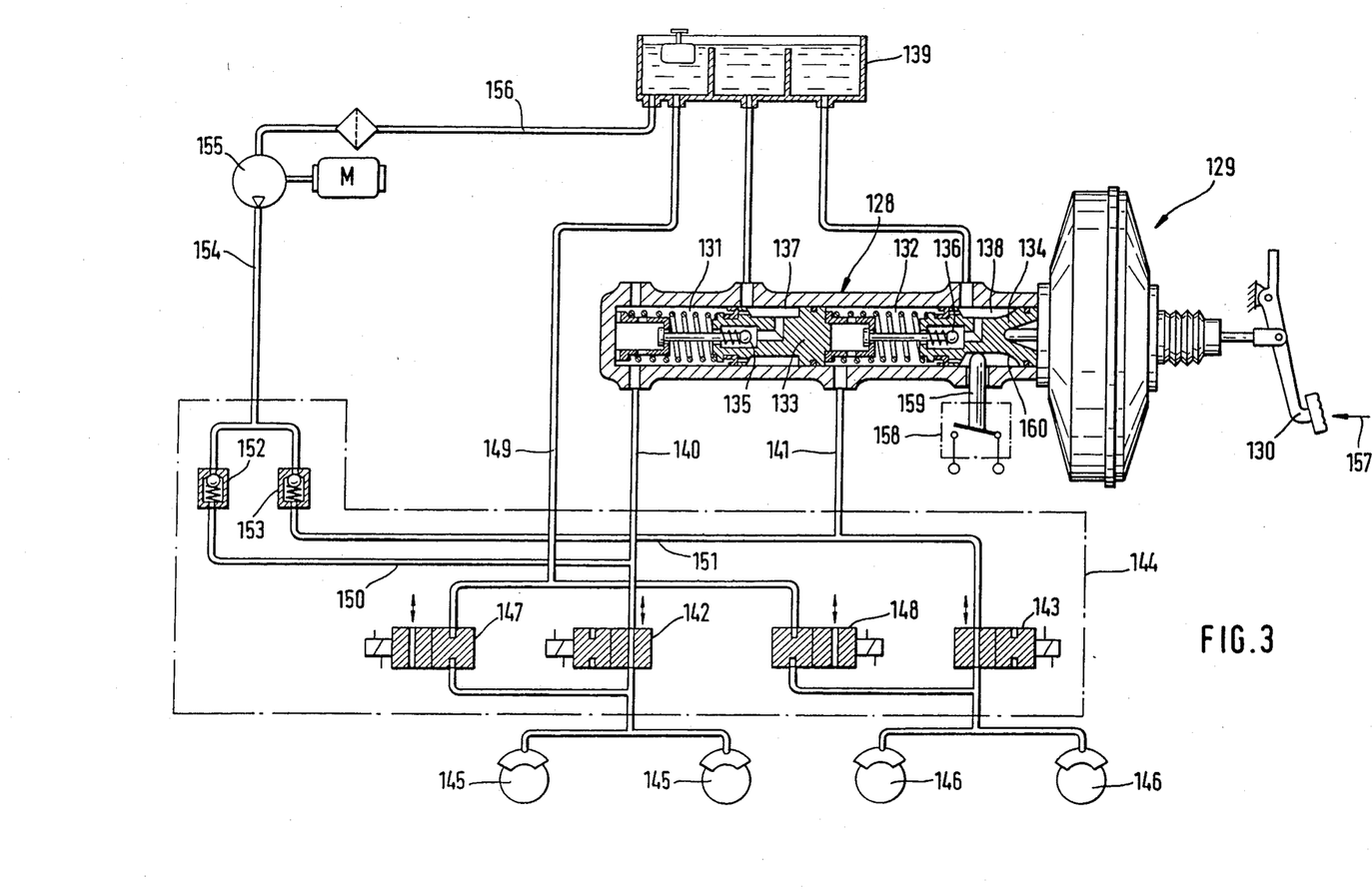
FIGS. 3 is, in a view similar to that of FIG. 1, showing of another embodiment of this invention.

FIG. 3 illustrates another embodiment of the inventive brake system composed of a tandem master cylinder 128 with two isolated working chambers 131 and 132 which can be decreased by an actuating stroke of the master cylinder pistons 133 and 134 (floating piston 133 and push rod piston 134).

The working chambers 131, 132 are connectible via central valves 135, 136 (which are open in the initial position illustrated in FIG. 3) with supply chambers 137, 138 which are connected to an unpressurized supply reservoir 139. Pressure lines 140, 141 lead from the working chambers 131, 132 of the tandem master cylinder 128 to solenoid valves 142, 143, open in their de-energized state, of a brake slip control device, which valves are arranged in a valve block 144. Connected to the solenoid valves 142, 143 each are two wheel brakes 145 and 146, respectively, with each one of the wheel brakes 145 and 146, respectively, being allocated to a front wheel of a vehicle and the other one of the wheel brakes 145 or 146 being allocated to a rear wheel of a vehicle disposed diagonally relative to the front wheel. Thus, a dual-circuit brake circuit with diagonal circuit allotment is concerned, yet other circuit allotments are also possible.

Further, the wheel brakes 145, 146 are connected to two solenoid valves 147, 148 of the valve block 144 which are closed in their de-energized state and whose inlet side connects via a relief line 149 with the supply reservoir 139.

A supply line 150, 151 branches off from each brake line 140, 141. Each supply line 150, 151 lead to a separate non-return valve 152, 153 which is closed in its initial position and which is likewise incorporated in the valve block 144. These non-return valves 152, 153 are arranged such that they open toward the supply lines 150, 151 only. From the non-return valves 152, 153, a line 154 leads to the outlet of a pump unit 155. Allocated to the push rod piston 134 is a switch 158. The switch 158 is actuated by an actuating pin 159 which cooperates with a ramp 160 at the push rod piston 134.

The pump unit can be composed of a single pump, but also of a double pump driven by a motor M.

The brake system illustrated in FIG. 3 operates as follows:

To initiate a braking operation, the brake pedal 130 is applied in the direction of the arrow 157, and the vacuum power brake booster 129 is driven. As a result, the vacuum brake power booster 129 moves the two master cylinder pistons 133, 134 into the master cylinder 128, whereby first the central valves 135, 136 are closed and the working chambers 131, 132 become isolated from the supply chambers 137, 138. Further displacement of the master cylinder pistons 133, 134 subsequently causes pressure to develop in the working chambers 131, 132 which propagates via the pressure lines 140, 141 and the open solenoid valves 142, 143 to the wheel brakes 145, 146 and actuates these corresponding to the actuating force exerted on the brake pedal 130. In this actuating phase, the pump unit 155 is not switched on so that no pressure is built up in the line 154. The non-return valves 152, 153 are closed and are kept in their closed position additionally by the pressure in the supply lines 150, 151 connected to the pressure line 140, 141.

Depending on how far the push rod piston 134 has been shifted into the brake master cylinder 128, the switch 158 is either closed or opened. If the piston is displaced only slightly, the switch is in the illustrated open position. If the piston has displaced so far that the actuating pin 159 has reached the base of the ramp 160, then the switch is actuated to assume the closed position.

In case an imminent locked condition of a vehicle wheel is detected now by the brake slip control device during a braking operation and if the switch 159 is closed, the pump 155 will be driven with full power. This causes development of pressure in the line 154 which is in excess of the actuating pressure in the pressure lines 140, 141 and/or the supply lines 150, 151 so that the non-return valves 152, 153 open and the quantity of pressure fluid delivered by the pump 155 is introduced via the supply lines 150, 151 into the pressure lines 140, 141. The inflowing pressure fluid causes the master cylinder pistons 133, 134 to slide back in the direction of brake release, while the actuating force at the brake pedal remains the same.

In the following, two operational situations are distinguished. In the first situation, the switch 158 has not yet been switched to assume its closed position upon commencement of brake slip control—what is e.g. possible only if braking is performed in the presence of low frictional values—the pump motor will not be switched on at the beginning of brake slip control. The pressure fluid discharged from the wheel brake cylinders is replenished out of the master brake cylinder so that the working pistons and the pedal are shifted with each control cycle further into the master brake cylinder. Yet as soon as the pin 159 is acted upon by the ramp 160, pump delivery will begin, and the required pressure fluid will not be supplied out of the master brake cylinder anymore. The pedal remains in a position corresponding to the position of the ramp at the push rod piston 134.

In the second situation, namely that the switch 158 has been switched into its closed position on brake application, the following condition will result. At the beginning of brake slip control, pressure fluid is supplied by the pump 155 to the working chambers 131, 132, thereby displacing the pistons 133 and 134 in the direction of their initial position. In this arrangement, the actuating pin 159 moves to the base of the ramp 160 so that the switch 158 opens. This causes the slip control device to disconnect the pump motor M, the pressure fluid delivery out of the pump 155 being interrupted. The pressure in the working chambers 131 and 132 corresponds to the force applied on the pedal 130. If for renewed pressure build-up in the wheel brakes it becomes necessary to remove pressure fluid from the working chambers 131, 132, the pistons 133 and 134 will be displaced and, as the actuating pin 159 ascends the ramp 160, the switch 158 will be closed. This sets the pump motor M into operation, and pressure fluid is delivered out of the pump 155. Thereby, the pedal 130 is not fully reset, but is reset to adopt a position corresponding to the switch position of the push rod piston 134.

Together with the switching on of the pump unit 155, the solenoid valves 142, 143 and 147, 148 are driven by the brake slip control device corresponding to the predetermined control characteristics in order to prevent locking of the vehicle wheels by way of periodic increase and decrease of the pressure in the wheel brakes 145, 146. The volume of pressure fluid required for these pressure control actions is taken from the pump flow when the master cylinder pistons 133, 134 have moved into the control position.

As an alternative to the described pump control, there may also be provision of a control, wherein the pump drive is switched off only in the control position (corresponding to the position of the ramp). This implies that when braking pressure is controlled at a small frictional value, the master cylinder piston can be displaced into the initial position and pump pressure adjustment takes place by means of the central valves, as is described in the state of the art. When braking in the presence of high frictional values, resetting of the pistons is effected according to the above-described arrangement.

It is to be noted that if the brake system is extended by a traction slip control system (TSC), the switch has to be bridged in the TSC-mode.

Figure 4:
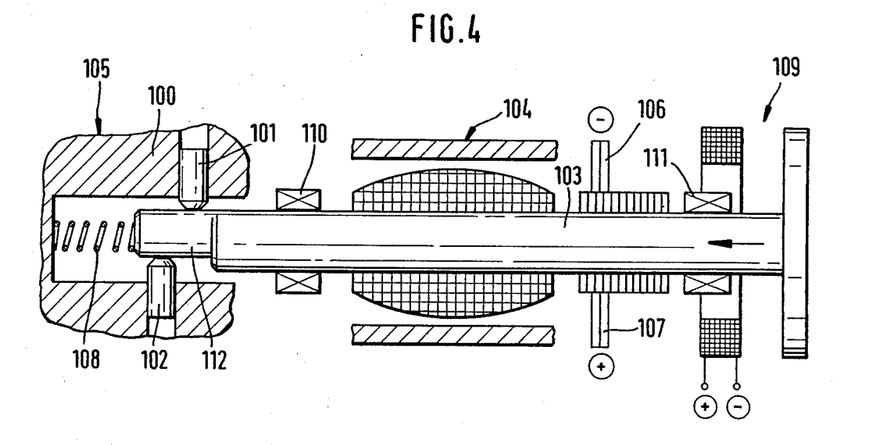
FIG. 4 is a view of a pump useful in an embodiment of this invention having a radial piston.

FIG. 4 shows the section fo a pump with a radial piston wherein the pump housing is assigned the reference numeral 100. The pistons are designated by 101, 102. In FIG. 4, a shaft 103 is depicted which is common to the electric motor 104 and the pump 105. Reference numerals 106, 107 designate the brushes of the electric motor. Reference numeral 109 is a pull magnet in whole. The shaft is supported at point 110, 111 and includes an eccentric 112 at its left end.

The pump 105 operates as follows in the presence of corresponding corrective signals of the electronic controller, the shaft 103 is moved by the magnet 109 in opposition to the force of the spring 108.

It can be seen from FIG. 4 that in the position shown therein the eccentric 112 moves the pump pistons 101, 102. That means, that pressure fluid volume is supplied by both pump pistons during the control mode into the master cylinder and into the pressure modulator. If the shaft is displaced further to the left, there will first result zero stroke for the first piston 101. Upon further displacement of the shaft to the left, zero stroke will result also for the second piston 102.

Figure 6:
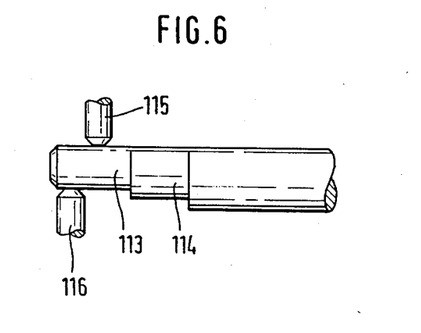

FIG. 6 shows a shaft with two eccentric stages. These eccentrics carry the reference numerals 113, 114. The two pistons 115, 116 perform the maximum stroke in the illustrated situation. After the first phase of displacement of the shaft to the left, the piston 116 will continue to perform the maximum stroke, while piston 115 performs a reduced stroke. After the second phase of displacement of the shaft to the left, piston 116 will perform a reduced stroke, while piston 115 does not perform any stroke. After the third phase of displacement of the shaft to the left, none of the pistons will perform any more strokes.

Figure 7:
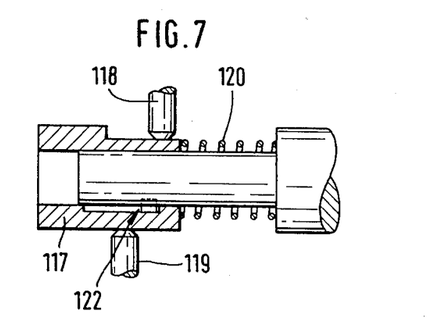

FIG. 7 illustrates a displaceable cam 117. Said cam can be shifted to the right in opposition to the force of the spring 120. In the illustrated situation, the two pistons 118, 119 perform a stroke. Upon displacement of the sleeve-shaped cam to the right, the piston 119 initially does not perform any stroke. Upon further displacement, neither piston 118, 119 will perform any stroke. The displacement of the cam 117 on the shaft 121 is enabled by provision of an axial sliding bearing. The drive of the shiftable cam by the shaft is effected by means of a spring-and-groove assembly 122. Displacement of the cam can be carried out by a pull magnet likewise in this embodiment.

Figure 5:
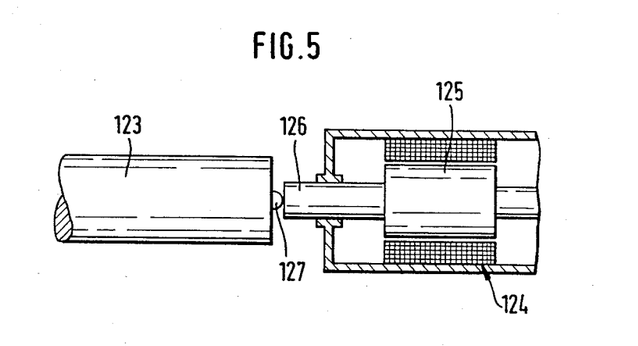
FIGS. 5–7 illustrate various embodiments of pump shafts useful in a pump assembly similar to that illustrated in FIG. 4 to enable stroke variations of the operating pistons of the pumps and, therefore, variation in the volume of fluid delivered by the pump.

FIG. 5 shows a variant for the axial displacement of the shaft 123. The shift magnet 124 forces the shaft 123 to the left by way of an extension of the armature 125. A pressure bearing 127 is incorporated between the extension 126 of the armature and the shaft 123.

Variations in the volume of delivery of the pumps is achieved by stroke variation of the operating pistons of the hydraulic pump in the embodiments illustrated in FIGS. 4 to 7.

Yet it is also possible to make use of the corrective signals of the electronic controller to connect or disconnect by coupling pumps or pump stages or operating pistons of pumps, depending on how much volume of delivery is required in order to move the piston of the master cylinder into its nominal position.

The axial displacement of the shaft and thus the position of the eccentric or cam are dependent upon the sensed position of the master cylinder piston and hence upon the volume in the pressure chamber of the master cylinder. As has been illustrated hereinabove, the pump is to be regarded as control member of a control circuit. That means that, upon the occurrence of undesirable displacement of the master cylinder piston to the left, the strokes and thus the volume of delivery are increased by readjusting the eccentric in relation to the piston.

The preceding description relates to several embodiments, yet the instant invention is not limited to these embodiments. The idea, which is valuable in practice, of utilizing a pump that is available in the anti-lock control system anyway to cause the operating piston of the master cylinder to assume its nominal position by varying the pump's volume of delivery can be embodied by many more variants. There are also possible numerous variants for embodying the principal idea to monitor the mode of operation of the entire anti-lock system by sensing the position, the direction of movement and the speed of the piston of the master cylinder.

What is claimed is:

1. A brake system for an automotive vehicle having at least one wheel brake and having an anti-lock device, said system comprising, in combination:
   a master cylinder having at least one working chamber with a pedal-actuated piston slidably mounted therein between first and second end positions and wherein said working chamber includes an output pressure port;
   means including a pump for providing an auxiliary source of pressure fluid which is controllable to provide a variable volume of delivery at an output of said source;
   means for applying said output of said source to said working chamber;
   means for selectively applying said output of said source and said output pressure port to at least one wheel brake;
   means for detecting the actual position of said piston between said first and second end positions and a predetermined position intermediate said first and second end positions; and
   means for controlling the variable volume of delivery of said pressure fluid at said output of said source in response to the detected position of said piston thereby to translate said piston toward said predetermined position.

2. The brake system according to claim 1, including means for detecting the velocity of translation of said piston between said first position and said second position and to provide an indication of faulty brake system operation when the detected velocity exceeds a predetermined velocity.

3. The brake system according to claim 1, wherein said means for detecting the position of said piston includes means for detecting the direction of movement of said piston.

4. The brake system according to claim 1, wherein said means for providing said source includes an electrical motor for activating said pump and which motor is controlled by electrical signals indicative of the detected position of said piston.

5. The brake system according to claim 1, wherein said pump is mechanically activated in response to the detected position of said piston.

6. The brake system according to claim 1, wherein during anti-lock control, said output of said source and said output pressure port are selectively removed from said one wheel brake.

7. The brake system according to claim 6, including means for selectively coupling said one wheel brake to an unpressurized supply reservoir during said anti-lock control.

8. The brake system according to claim 1, wherein said means for controlling the volume delivery of said pressure fluid translates said piston to said predetermined position intermediate said first and second end positions during an anti-lock control operation.

9. A brake system method for an automotive vehicle having at least one wheel brake and having an anti-lock device, said method comprising the steps of:
   providing a master cylinder having at least one working chamber with a pedal-actuated piston slidably mounted therein between first and second end positions and said working chamber having an output pressure port;
   providing an auxiliary source of pressure fluid comprising a pump which is controllable to provide a variable volume of delivery at an output of said source;
   applying said output of said source to said working chamber;
   selectively applying said output of said source and said output pressure port to at least one wheel brake;
   detecting the actual position of said piston between said first and second end positions and a predetermined position intermediate said first and second end positions; and,
   controlling the variable volume of delivery of said pressure fluid at said output of said source in response to the detected position of said piston to translate said piston toward said predetermined position.

10. The brake system method according to claim 9, wherein said step of controlling the volume delivery of said pressure fluid includes the step of translating said piston to said predetermined position intermediate said first and second end positions during an anti-lock control operation.

* * * * *